(12) United States Patent
Haga

(10) Patent No.: US 8,269,370 B2
(45) Date of Patent: Sep. 18, 2012

(54) POWER CONVERTER AND ITS CONTROL METHOD AND AIR CONDITIONER

(75) Inventor: Hitoshi Haga, Miyagi (JP)

(73) Assignee: Daikin Industries, Ltd., Osaka (JP)

( * ) Notice: Subject to any disclaimer, the term of this patent is extended or adjusted under 35 U.S.C. 154(b) by 220 days.

(21) Appl. No.: 12/226,434

(22) PCT Filed: Apr. 12, 2007

(86) PCT No.: PCT/JP2007/058085
§ 371 (c)(1),
(2), (4) Date: Dec. 4, 2008

(87) PCT Pub. No.: WO2007/123045
PCT Pub. Date: Nov. 1, 2007

(65) Prior Publication Data
US 2009/0102285 A1    Apr. 23, 2009

(30) Foreign Application Priority Data
Apr. 19, 2006  (JP) ................. 2006-115814

(51) Int. Cl.
H02J 1/12    (2006.01)
H02J 3/00    (2006.01)
(52) U.S. Cl. ............... 307/25; 363/17; 62/129; 307/151
(58) Field of Classification Search .................. 307/25, 307/11
See application file for complete search history.

(56) References Cited

U.S. PATENT DOCUMENTS

| 4,480,298 | A | * | 10/1984 | Fry ................................. 363/28 |
| 5,267,136 | A | * | 11/1993 | Suga et al. ...................... 363/65 |
| 5,341,278 | A | * | 8/1994 | Brooks ............................ 363/16 |
| 5,552,980 | A | * | 9/1996 | Garces et al. ................... 363/98 |

(Continued)

FOREIGN PATENT DOCUMENTS

JP    10-080150 A    3/1998

(Continued)

OTHER PUBLICATIONS

English translation of JP Pg-pub 2004/180497 to Balakrishnan, Jun. 24, 2004.*

(Continued)

Primary Examiner — Rexford Barnie
Assistant Examiner — Justen Fauth
(74) Attorney, Agent, or Firm — Birch, Stewart, Kolasch & Birch, LLP

(57) ABSTRACT

A controller (10) includes subtracters (101, 105), a command value corrector (103), and a control block (102). The subtracter (101) obtains a deviation ($\Delta v0$) of an output voltage (v0) applied from a switching power-supply circuit (61) to a second load (Cdc+Load) with respect to its command value (v0*). The control block (102) performs PI control on the basis of the deviation ($\Delta v0$) to generate a command value (idc*) for a current (idc) flowing in a coil (Ldc). The command value corrector (103) corrects the command value (idc*) such that high-frequency components of a current (iL) flowing in a first power-supply line (21), with respect to the fundamental frequency of an input current (iu1, iv1, iw1), are consumed in the switching power-supply circuit (61). The subtracter (105) obtains a deviation ($\Delta idc$) between the corrected command value (idc*) and the current (idc). Commands (r1, r2) for switches are generated on the basis of the deviation ($\Delta idc$).

26 Claims, 10 Drawing Sheets

U.S. PATENT DOCUMENTS

| | | | |
|---|---|---|---|
| 6,467,286 B2 * | 10/2002 | Hasebe et al. | 62/185 |
| 2001/0052704 A1 * | 12/2001 | Bosley et al. | 290/52 |
| 2004/0056661 A1 | 3/2004 | Maeda et al. | |
| 2007/0091647 A1 * | 4/2007 | Takemura et al. | 363/16 |
| 2007/0210584 A1 * | 9/2007 | Stahlhut et al. | 290/52 |

FOREIGN PATENT DOCUMENTS

| | | |
|---|---|---|
| JP | 10-80150 A | 3/1998 |
| JP | 11-098850 A | 4/1999 |
| JP | 11-187671 A | 7/1999 |
| JP | 2003-061382 A | 2/2003 |
| JP | 2006-081261 A | 3/2006 |
| WO | WO-03/032478 A1 | 4/2003 |

OTHER PUBLICATIONS

English translation of WO Pg-pub 2005/006531 to Hasebe et al., Jan. 20, 2005.*

JP Patent 11-206119 to Cho et al.—english translation, Jul. 30, 1990.*

JP Patent 06-046535 to Koizumi et al.—english abstract, Feb. 18, 1994.*

JP Patent 04-331467 to Kikuchihara—english abstract, Nov. 19, 1992.*

Tun et al., "New Type Sinusoidal Input UPS Controlled by DC Chopper type Active Filter", the transactions III of Heisei 14 (2002) IEEJ Industry Applications Society Conference, The Institute of Electrical Engineer's of Japan, pp. 1301-1306.

Ito et al., "Capacitor-less PWM Inverter", The transactions of Shawa 63, IEEJ Industry Applications Society National Conference, The Institute of Electrical Engineers of Japan, 1988, pp. 445-450.

Haga et al., "Method of Improving Input Current Waveform of Single-Phase Field Capacitor-less IPM Motor Driving Inverter", The Transactions I of Heisei 14 (2002) IEEJ Industry Applications Society Conference, pp. 415-418.

* cited by examiner

F I G . 1
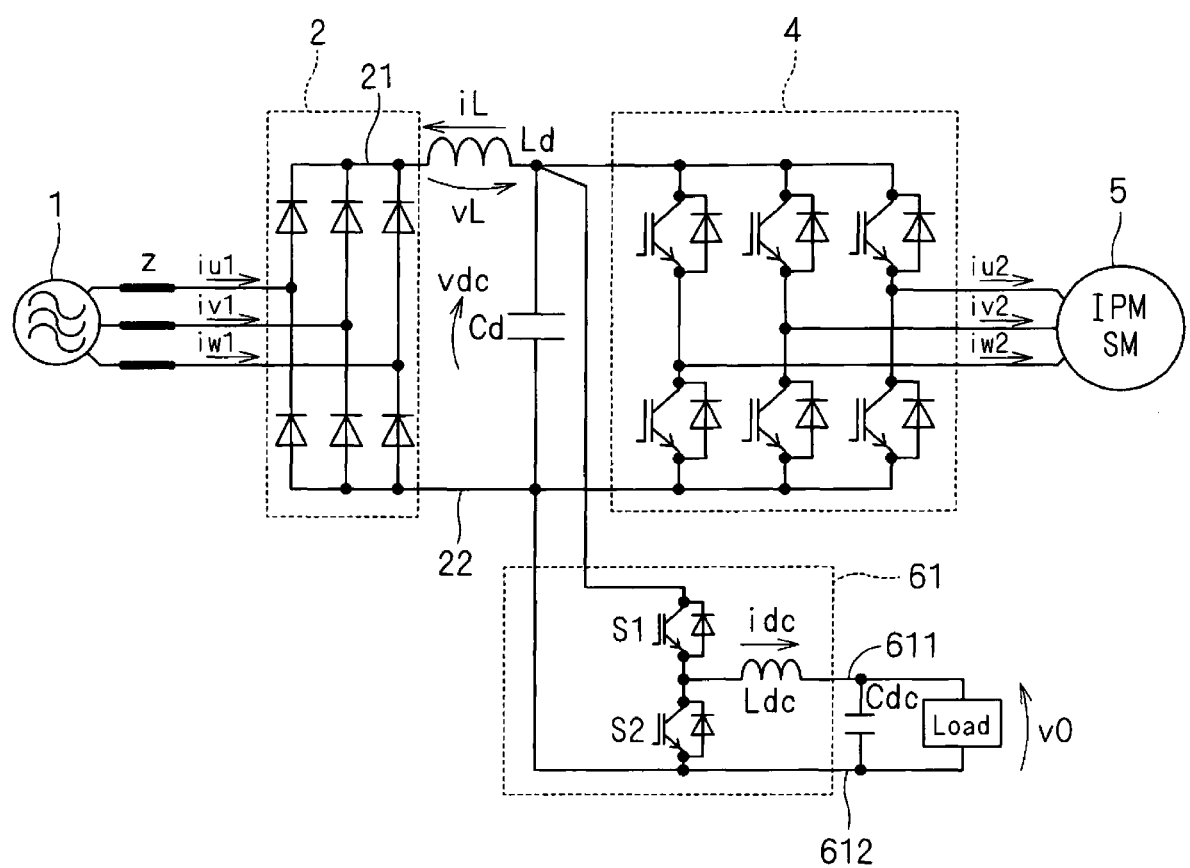

F I G. 4
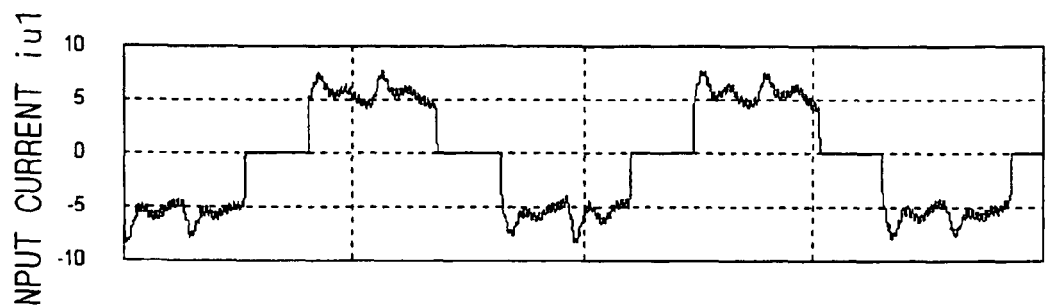
F I G. 5
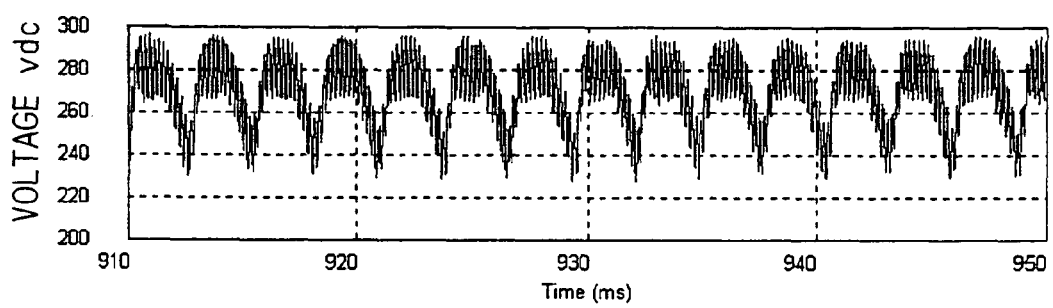
F I G. 6
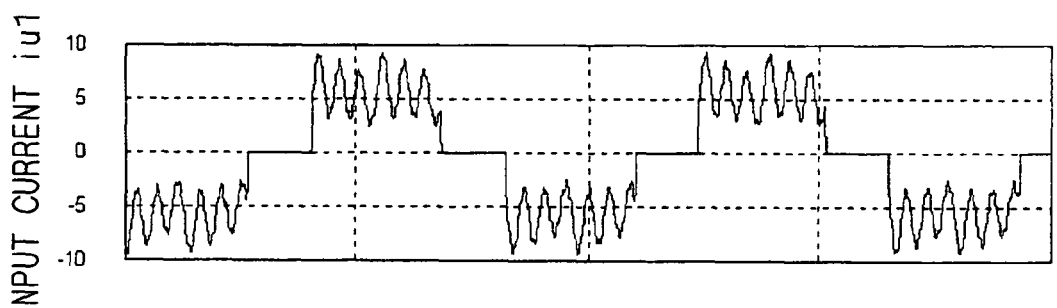
F I G. 7
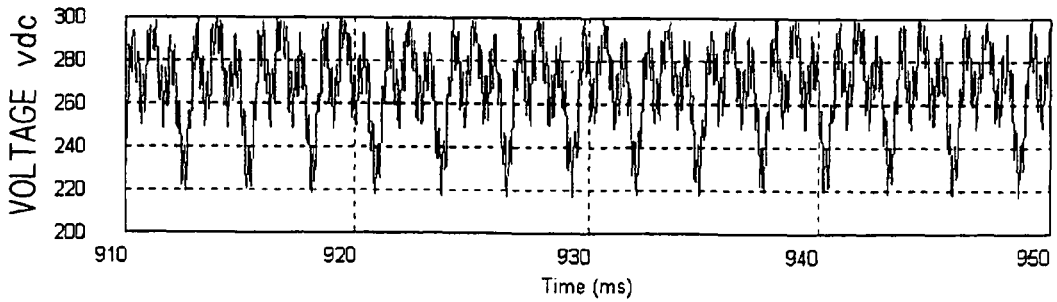

F I G . 1 5
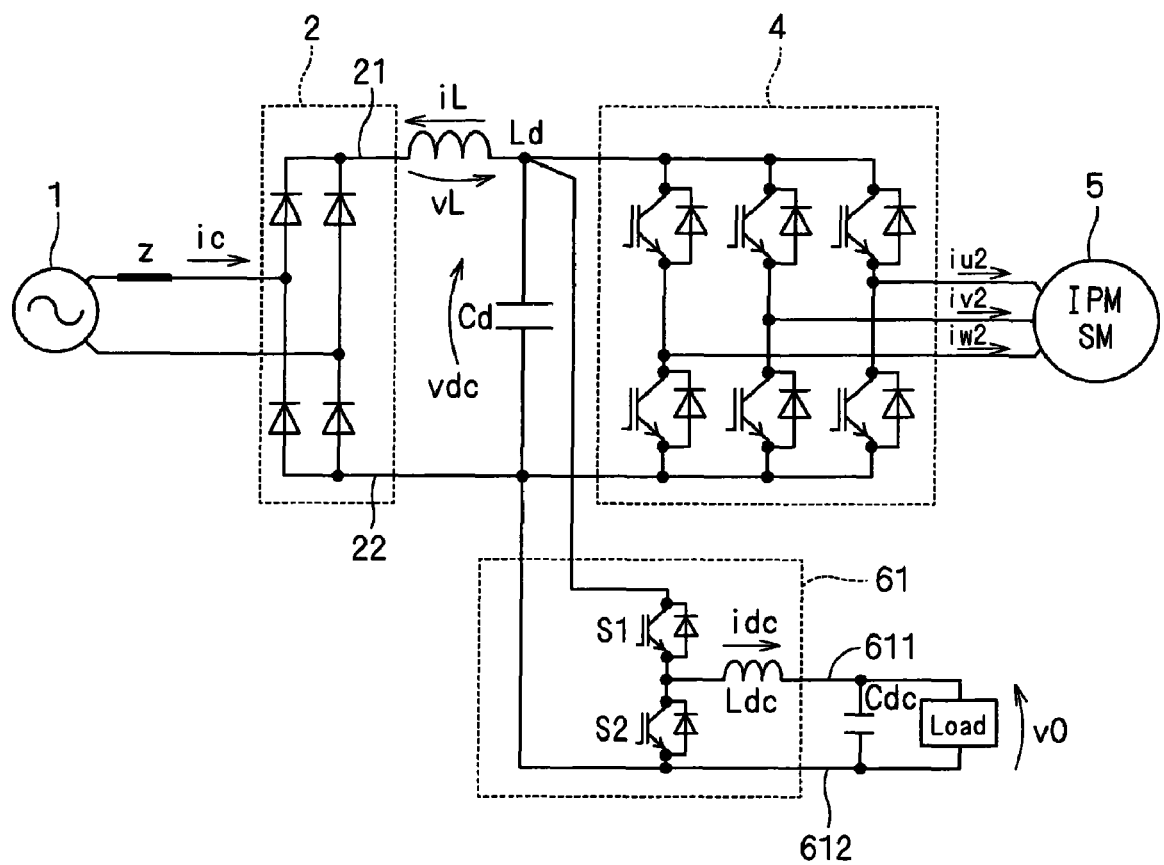
F I G . 1 6
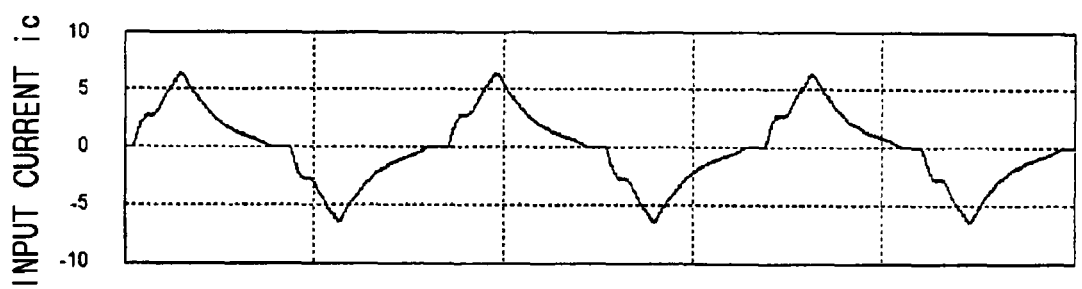
F I G . 1 7
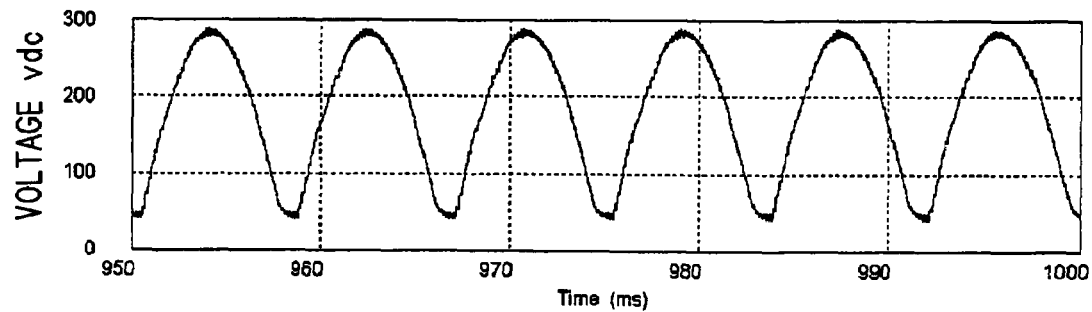

POWER CONVERTER AND ITS CONTROL METHOD AND AIR CONDITIONER

TECHNICAL FIELD

The present invention relates to a power converter and its control method, and particularly to a power converter of a type commonly called "capacitor-less" and its control method.

BACKGROUND ART

An air conditioner includes a motor for a refrigerant compressor, and a power converter for supplying desired power to the motor. A common power converter includes a converter, an inverter, and a smoothing capacitor between them, and converts power supplied from an alternating-current power supply. Also, a reactor is provided to improve the input power factor. For example, the inductance of the reactor is about 2 mH, and the capacitance of the capacitor is about 2000 μF.

The reactor and capacitor are especially large-sized and heavy-weighted among the parts of the power converter. Also, they constitute a cause of increased loss due to heat generation.

Accordingly, a technique is proposed in which the capacitance of the capacitor is reduced to downsize the capacitor. This technique is commonly called "capacitor-less".

Techniques related to the present invention are shown below. Particularly, Non-Patent Document 3 discloses a technique that further omits the reactor.

Non-Patent Document 1: Myint Ko Tun and one other, "New Type Sinusoidal Input UPS Controlled by DC Chopper Type Active Filter", the Transactions III of Heisei 14 (2002) IEEJ Industry Applications Society Conference, The Institute of Electrical Engineers of Japan, August Heisei 14 (2002), pp. 1301-1306

Non-Patent Document 2: Yoichi Ito and one other, "Capacitor-less PWM Inverter", The transactions of Showa 63 (1988) IEEJ Industry Applications Society National Conference, The Institute of Electrical Engineers of Japan, August Showa 63 (1988), pp. 445-450

Non-Patent Document 3: Hitoshi Haga and one other, "Method of Improving Input Current Waveform of Single-Phase Field Capacitor-less IPM Motor Driving Inverter", The Transactions I of Heisei 14 (2002) IEEJ Industry Applications Society Conference, August Heisei 14 (2002), pp. 415-418

DISCLOSURE OF THE INVENTION

Problems to be Solved by the Invention

However, reducing the inductance of the reactor and capacitance of the capacitor increases the resonant frequency determined by the reactor and smoothing capacitor, and then a lot of high-frequency components are contained in the power-supply current waveform, causing high-frequency disturbance to the ac power supply. This is not preferable from the viewpoint of JIS standards (JIS61000-3-2), for example.

Such high-frequency disturbance can be suppressed e.g. by controlling the switching operation of the inverter. However, this requires increasing the inverter switching frequency, e.g. up to about ten times the resonant frequency. This is not very desirable because this causes increased switching loss in the inverter.

The present invention has been made by considering the conditions above, and an object of the present invention is to suppress high-frequency disturbance to an ac power supply.

Means for Solving the Problems

According to a first aspect of the power converter of the present invention, a power converter comprises: a rectifier circuit (2) that rectifies an input current (iu1, iv1, iw1; ic) from an alternating-current power supply (1) and outputs a direct-current voltage between a first power-supply line (21) and a second power-supply line (22), so as to apply said direct-current voltage to a first load (4+5); a capacitor (Cd) connected between said first power-supply line and said second power-supply line; and a switching power-supply circuit (61; 62; 6) connected between said first power-supply line and said second power-supply line, said switching power-supply circuit performing a switching operation with a duty based on a first current (–iL) flowing in said first power-supply line, to supply power to a second load (Cdc+Load; C2+Load; 7) from a high-frequency component of said first current with respect to a fundamental frequency of said input current.

According to a second aspect of the power converter of the present invention, in the power converter of the first aspect, said switching power-supply circuit (61; 62) comprises a switch (S1, S2) that performs said switching operation according to a command value (idc*; idc*) that is obtained on the basis of: a deviation (Δv0) of an output voltage (v0) applied to said second load (Cdc+Load; C2+Load) from said switching power-supply circuit with respect to its command value (v0*); and said first current (–iL).

According to a third aspect of the power converter of the present invention, in the power converter of the first aspect, said second load is a motor (7), and said switching power-supply circuit (6) comprises a switch (S31-S36) that performs said switching operation according to a command value (iq*) that is obtained on the basis of: a deviation (Δω) of a rotating speed (ω) of said motor with respect to its command value (ω*); and said first current (–iL).

According to a fourth aspect of the power converter of the present invention, in the power converter of the first aspect, said switching power-supply circuit (61; 62; 6) comprises a switch (S1, S2; S1, S2; S31-S36) that performs said switching operation according to a command value (v*; v*; vq*) that is obtained on the basis of: said first current (–iL) and a second current (idc; idc; iq) flowing in said second load (Cdc+Load; C2+Load; 7).

According to a fifth aspect of the power converter of the present invention, a power converter comprises: a rectifier circuit (2) that rectifies an input current (iu1, iv1, iw1; ic) from an alternating-current power supply (1) and outputs a direct-current voltage between a first power-supply line (21) and a second power-supply line (22), so as to apply said direct-current voltage to a first load (4+5); a capacitor (Cd) connected between said first power-supply line and said second power-supply line; a reactor (Ld) constituting a serial resonant circuit together with said capacitor; and a switching power-supply circuit (61; 62; 6) connected between said first power-supply line and said second power-supply line, said switching power-supply circuit performing a switching operation with a duty based on a first voltage (vL) applied to said reactor, to supply power to a second load (Cdc+Load; C2+Load; 7) from a high-frequency component of a first current (–iL) flowing in said first power-supply line with respect to a fundamental frequency of said input current.

According to a sixth aspect of the power converter of the present invention, in the power converter of the fifth aspect, said switching power-supply circuit (61; 62) comprises a switch (S1, S2) that performs said switching operation according to a command value (idc*; idc*) that is obtained on the basis of: a deviation (Δv0) of an output voltage (v0) applied to said second load (Cdc+Load; C2+Load) from said switching power-supply circuit with respect to its command value (v0*); and said first voltage (vL).

According to a seventh aspect of the power converter of the present invention, in the power converter of the fifth aspect, said second load is a motor (7), and said switching power-supply circuit (6) comprises a switch (S31-S36) that performs said switching operation according to a command value (iq*) that is obtained on the basis of: a deviation (Δω) of a rotating speed (ω) of said motor with respect to its command value (ω*); and said first voltage (vL).

According to an eighth aspect of the power converter of the present invention, in the power converter of the fifth aspect, said switching power-supply circuit (61; 62; 6) comprises a switch (S1, S2; S1, S2; S31-S36) that performs said switching operation according to a command value (v*; v*; vq*) that is obtained on the basis of: said first voltage (vL) and a second current (idc; idc; iq) flowing in said second load (Cdc+Load; C2+Load; 7).

According to a ninth aspect of the power converter of the present invention, in the power converter of any of the second, third, sixth and seventh aspects, said switch (S1, S2; S1, S2; S31-S36) performs said switching operation according to a second command value (v*; v*; vq*) that is obtained on the basis of: said command value (idc*; idc*; iq*) and a second current (idc; idc; iq) flowing in said second load (Cdc+Load; C2+Load; 7). According to a tenth aspect of the power converter of the present invention, in the power converter of any of the second to fourth, and sixth to ninth aspects, said first load (4+5) comprises a main load (5) and an inverter (4) that receives a voltage (vdc) across both ends of said capacitor and outputs an alternating current (iu2, iv2, iw2) to said main load, and said duty is determined by a comparison between said command value (idc; iq; v*; vq*) and a carrier for said inverter (4).

According to an eleventh aspect of the power converter of the present invention, in the power converter of any of the first to ninth aspects, said first load (4+5) comprises a main load (5) and an inverter (4) that receives a voltage (vdc) across both ends of said capacitor and outputs an alternating current (iu2, iv2, iw2) to said main load.

According to a first aspect of the air conditioner of the present invention, an air conditioner comprises: the power converter according to the eleventh aspect; a motor for a refrigerant compressor, said motor forming said main load (5); and an air-cooling fan that forms said second load (Cdc+Load; C2+Load; 7), and said air conditioner performs air conditioning by operating said fan to remove latent heat of a refrigerant compressed by said refrigerant compressor.

According to a first aspect of the power converter controlling method of the present invention, a power converter comprises: a rectifier circuit (2) that rectifies an input current (iu1, iv1, iw1) from an alternating-current power supply (1) and outputs a direct-current voltage between a first power-supply line and a second power-supply line, so as to apply said direct-current voltage to a first load (4+5); a capacitor (Cd) connected between said first power-supply line and said second power-supply line; and a switching power-supply circuit (61; 62; 6) connected between said first power-supply line and said second power-supply line, and said power converter controlling method causes said switching power-supply circuit to perform a switching operation with a duty based on a first current (−iL) flowing in said first power-supply line, to supply power to a second load (Cdc+Load; C2+Load; 7) from a high-frequency component of said first current with respect to a fundamental frequency of said input current.

According to a second aspect of the power converter controlling method of the present invention, in the power converter controlling method of the first aspect, said power converter controlling method causes said switching power-supply circuit (61; 62) to perform said switching operation according to a command value (idc*; idc*) that is obtained on the basis of: a deviation (Δv0) of an output voltage (v0) applied to said second load (Cdc+Load; C2+Load) from said switching power-supply circuit with respect to its command value (v0*); and said first current (−iL).

According to a third aspect of the power converter controlling method of the present invention, in the power converter controlling method of the first aspect, said second load is a motor (7), and said power converter controlling method causes said switching power-supply circuit (6) to perform said switching operation according to a command value (iq*) that is obtained on the basis of: a deviation (Δω) of a rotating speed (ω) of said motor with respect to its command value (ω*); and said first current (−iL).

According to a fourth aspect of the power converter controlling method of the present invention, in the power converter controlling method of the first aspect, said power converter controlling method causes said switching power-supply circuit (61; 62; 6) to perform said switching operation according to a command value (v*; v*; vq*) that is obtained on the basis of: said first current (−iL) and a second current (idc; idc; iq) flowing in said second load (Cdc+Load; C2+Load; 7).

According to a fifth aspect of the power converter controlling method of the present invention, a power converter comprises: a rectifier circuit (2) that rectifies an input current (iu1, iv1, iw1) from an alternating-current power supply (1) and outputs a direct-current voltage between a first power-supply line and a second power-supply line, so as to apply said direct-current voltage to a first load (4+5); a capacitor (Cd) connected between said first power-supply line and said second power-supply line; a reactor (Ld) constituting a serial resonant circuit together with said capacitor; and a switching power-supply circuit (61; 62; 6) connected between said first power-supply line and said second power-supply line, and said power converter controlling method causes said switching power-supply circuit to perform a switching operation with a duty based on a first voltage (vL) applied to said reactor, to supply power to a second load (Cdc+Load; C2+Load; 7) from a high-frequency component of a first current (−iL) flowing in said first power-supply line with respect to a fundamental frequency of said input current.

According to a sixth aspect of the power converter controlling method of the present invention, in the power converter controlling method of the fifth aspect, said power converter controlling method causes said switching power-supply circuit (61; 62) to perform said switching operation according to a command value (idc*; idc*) that is obtained on the basis of: a deviation (Δv0) of an output voltage (v0) applied to said second load (Cdc+Load; C2+Load) from said switching power-supply circuit with respect to its command value (v0*); and said first voltage (vL).

According to a seventh aspect of the power converter controlling method of the present invention, in the power converter controlling method of the fifth aspect, said second load is a motor (7), and said power converter controlling method causes said switching power-supply circuit (6) to perform said switching operation according to a command value (iq*) that is obtained on the basis of: a deviation (Δω) of a rotating speed (ω) of said motor with respect to its command value (ω*); and said first voltage (vL).

According to an eighth aspect of the power converter controlling method of the present invention, in the power converter controlling method of the fifth aspect, said power converter controlling method causes said switching power-supply circuit (61; 62; 6) to perform said switching operation according to a command value (v*; v*; vq*) that is obtained on the basis of: said first voltage (vL) and a second current (idc; idc; iq) flowing in said second load (Cdc+Load; C2+Load; 7).

According to a ninth aspect of the power converter controlling method of the present invention, in the power converter controlling method of any of the second, third, sixth and seventh aspects, said power converter controlling method causes said switching power-supply circuit (61; 62; 6) to perform said switching operation according to a second command value (v*; v*; vq*) that is obtained on the basis of: said command value (idc*; idc*; iq*) and a second current (idc; idc; iq) flowing in said second load (Cdc+Load; C2+Load; 7).

According to a tenth aspect of the power converter controlling method of the present invention, in the power converter controlling method of any of the second to fourth, and sixth to ninth aspects, said first load (4+5) comprises a main load (5) and an inverter (4) that receives a voltage (vdc) across both ends of said capacitor and outputs an alternating current (iu2, iv2, iw2) to said main load, and said duty is determined by a comparison between said command value (idc; iq; v*; vq*) and a carrier for said inverter (4).

Effects of the Invention

According to any of the first, fourth, fifth and eighth aspects of the power converter of the present invention, or according to any of the first, fourth, fifth and eighth aspects of the power converter controlling method, the second load consumes a high-frequency component contained in the first current with respect to the fundamental frequency of the input current, which makes it possible to suppress the high-frequency component of the input current to the rectifier circuit and to suppress high-frequency disturbance to the alternating-current power supply.

According to the second or sixth aspect of the power converter of the present invention, or according to the second or sixth aspect of the power converter controlling method, it is possible to stably apply the output voltage to the second load.

According to the third or seventh aspect of the power converter of the present invention, or the third or seventh aspect of the power converter controlling method, it is possible to stably rotate the motor.

According to the ninth aspect of the power converter of the present invention or the ninth aspect of the power converter controlling method, it is possible to precisely control the power consumption of the second load.

According to the tenth aspect of the power converter of the present invention or the tenth aspect of the power converter controlling method, it is possible to synchronize the switching of the switching power-supply circuit with the switching of the inverter.

According to the eleventh aspect of the power converter of the present invention, the switching loss in the inverter is small.

According to the first aspect of the air conditioner of the present invention, it is suitable for the control using the power converter of the eleventh aspect because the air-cooling fan requires less power consumption and rotary control accuracy than the motor for a refrigerant compressor.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram conceptually illustrating a power converter that is described in a first preferred embodiment.

FIG. 4 is a graph illustrating an input current iu1 that is exhibited when the control described in the first preferred embodiment is performed.

FIG. 5 is a graph illustrating a voltage vdc that is exhibited when the control described in the first preferred embodiment is performed.

FIG. 6 is a graph illustrating the input current iu1 that is exhibited before the control described in the first preferred embodiment is performed.

FIG. 7 is a graph illustrating the voltage vdc that is exhibited before the control described in the first preferred embodiment is performed.

FIG. 15 is a diagram conceptually illustrating a power converter that is described in a third preferred embodiment.

FIG. 16 is a graph illustrating an input current ic that is exhibited when the control described in the third preferred embodiment is performed.

FIG. 17 is a graph illustrating a voltage vdc that is exhibited when the control described in the third preferred embodiment is performed.

BEST MODE FOR CARRYING OUT THE INVENTION

First Preferred Embodiment
<Configuration of Power Converter>

Figure 2:
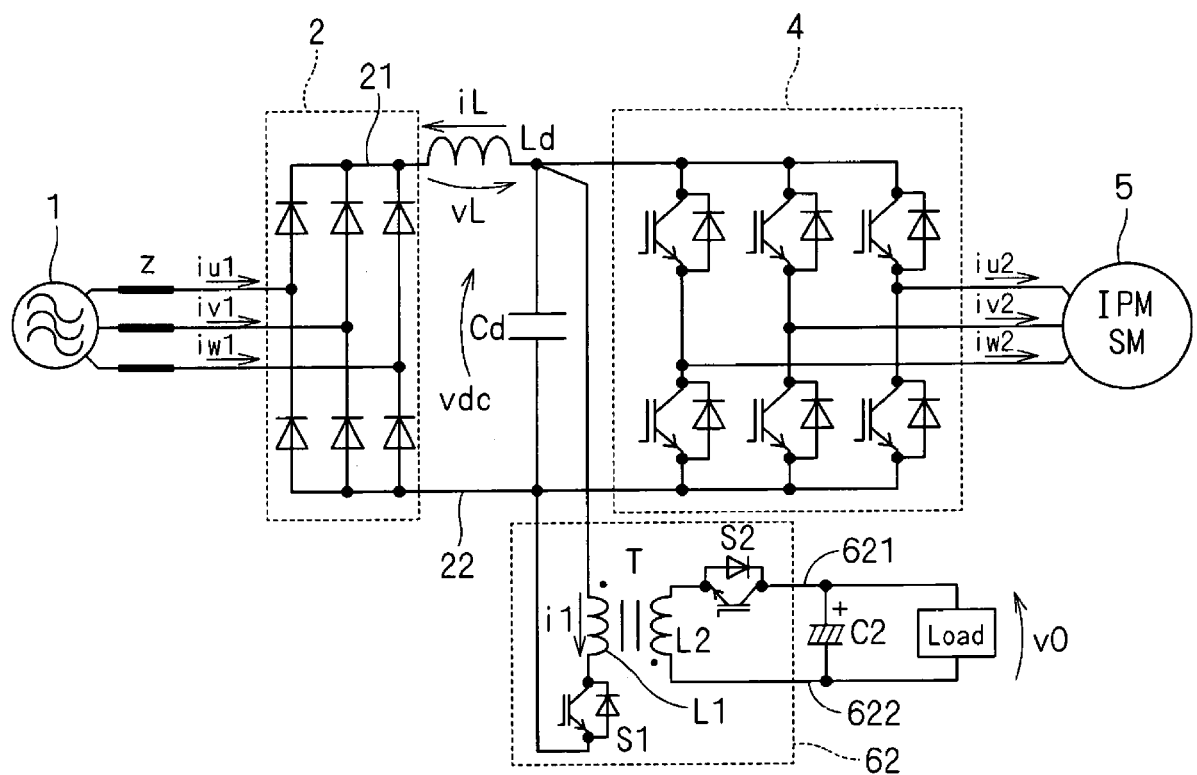
FIG. 2 is a diagram conceptually illustrating a power converter that is described in the first preferred embodiment.

FIGS. 1 and 2 each conceptually illustrate a power converter according to this preferred embodiment. The power converters each include a first power-supply line 21, a second power-supply line 22, a rectifier circuit 2, a capacitor Cd, a reactor Ld, an inverter 4, and a switching power-supply circuit 61 (or a switching power-supply circuit 62).

FIGS. 1 and 2 show an ac power supply 1 that supplies power to the power converter, and a motor 5 that is supplied with the output from the inverter 4. Also, FIG. 1 shows a capacitor Cdc and a driven part Load that are supplied with the output of the switching power-supply circuit 61, and FIG. 2 shows a capacitor C2 and a driven part Load that are supplied with the output of the switching power-supply circuit 62. The capacitor Cdc or C2 smoothes the output of the switching power-supply circuit 61 or 62 and supplies it to the driven part Load. This preferred embodiment adopts a three-phase alternating-current power supply as the ac power supply 1.

The motor 5 can be regarded as a main load, the load composed of the motor 5 and the inverter 4 can be regarded as a first load (which is hereinafter denoted as "4+5"), the load (FIG. 1) composed of the capacitor Cdc and the driven part Load can be regarded as a second load (which is hereinafter denoted as "Cdc+Load"), and the load (FIG. 2) composed of the capacitor C2 and the driven part Load can be regarded as a second load (which is hereinafter denoted as "C2+Load").

In this preferred embodiment, the rectifier circuit 2 is a diode bridge, which rectifies input currents iu1, iv1, iw1 from the ac power supply 1 and outputs a dc voltage between the first power-supply line 21 and the second power-supply line 22.

The capacitor Cd is connected between the first power-supply line 21 and the second power-supply line 22. The reactor Ld is provided on the first power-supply line 21 between the rectifier circuit 2 and the capacitor Cd. The capacitor Cd and the reactor Ld form a serial resonant circuit.

The inverter 4 in this preferred embodiment is a three-phase inverter, which receives a voltage vdc across both ends of the capacitor Cd and outputs alternating currents iu2, iv2, iw2 to the motor 5. The motor 5 is driven by the supply of the output of the inverter 4.

Each of the switching power-supply circuits 61 and 62 is connected between the first power-supply line 21 and the second power-supply line 22. They are each connected to both ends of the capacitor Cd in FIGS. 1 and 2, but they may be connected to both ends of the serial resonant circuit formed of the capacitor Cd and the reactor Ld, for example.

In FIG. 1, the switching power-supply circuit 61 adopts a step-down chopper. The step-down chopper includes switches S1, S2, a coil Ldc, and output ends 611 and 612. The switches S1 and S2 are connected in series between the first power-supply line 21 and the second power-supply line 22. The output ends 611 and 612 are connected respectively to both ends of the switch S2. The coil Ldc is connected in series to the switch S2 between the output ends 611 and 612. The second load, Cdc+Load, is connected between the output ends 611 and 612.

In FIG. 2, the switching power-supply circuit 62 adopts a flyback converter. The flyback converter 62 includes switches S1, S2, a transformer T, and output ends 621 and 622. The primary coil L1 of the transformer T is connected between the first power-supply line 21 and the second power-supply line 22, and its secondary coil L2 is connected between the output ends 621 and 622. The switch S1 is series-connected to the coil L1 between the first power-supply line 21 and the second power-supply line 22. The switch S2 is series-connected to the coil L2 between the output ends 621 and 622. The second load, C2+Load, is connected between the output ends 621 and 622.

In this preferred embodiment, the switches S1 and S2 adopt IGBT modules composed of IGBTs (Insulated Gate Bipolar Transistors) and diodes.

<Control 1 of the Power Converter>

Figure 3:
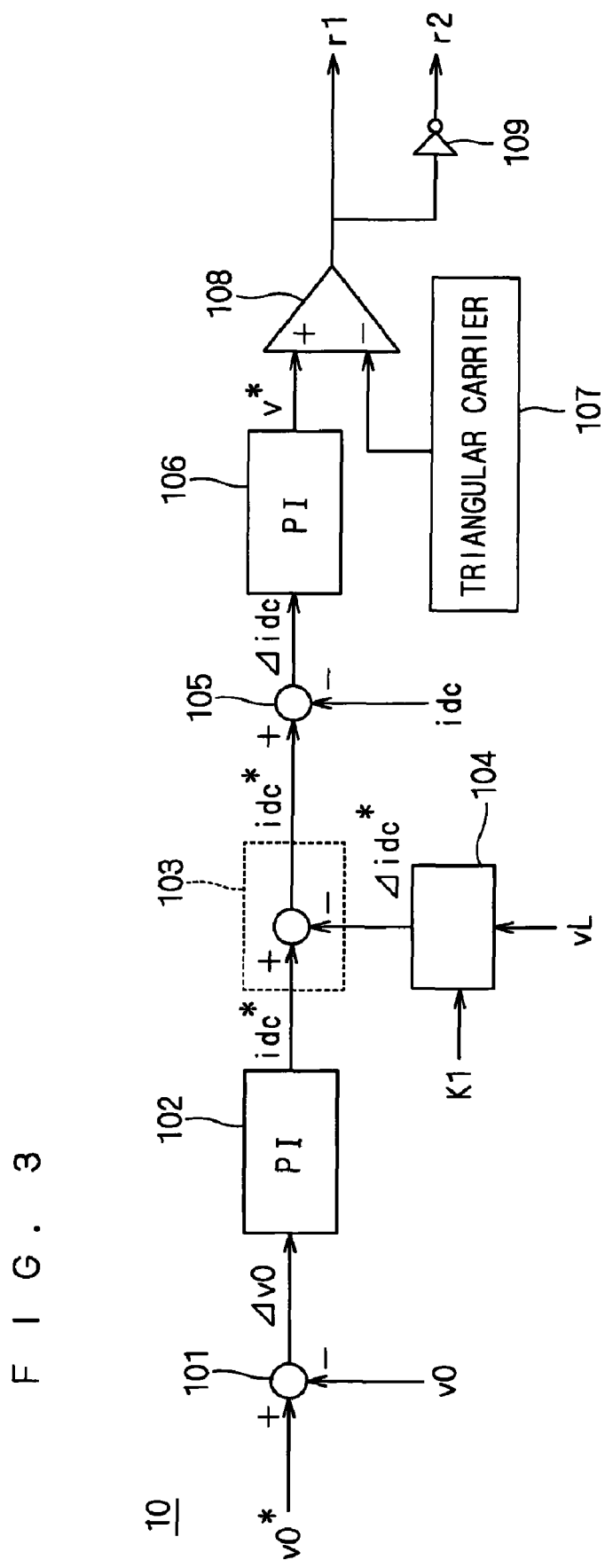
FIG. 3 is a diagram conceptually illustrating a controller 10 for the power converter.

FIG. 3 conceptually illustrates a controller 10 for controlling the power converter shown in FIG. 1.

The controller 10 includes subtracters 101, 105, command value corrector 103, control blocks 102, 104, 106, a triangular carrier generator 107, a comparator 108, and a NOT circuit 109.

The subtracter 101 obtains a deviation $\Delta v0$ of an output voltage v0 applied from the switching power-supply circuit 61 to the second load Cdc+Load, with respect to its command value v0*.

The control block 102 performs PI control on the basis of the deviation $\Delta v0$, so as to generate a command value idc* for a current idc flowing in the coil Ldc. According to this control, it is possible to make the voltage v0 close to the command value v0*, making it possible to stably apply the output voltage to the second load Cdc+Load.

The command value corrector 103 corrects the command value idc* such that high-frequency components of the current iL flowing in the first power-supply line 21, with respect to the fundamental frequency of the input currents iu1, iv1, iw1, are consumed in the switching power-supply circuit 61.

In this preferred embodiment, the command value corrector 103 corrects the command value idc* on the basis of a voltage vL applied to the reactor Ld. Specifically, the control block 104 multiplies the voltage vL and a gain K1 to obtain a correction value $\Delta idc^*$, and the command value corrector 103 subtracts the correction value $\Delta idc^*$ from the command value idc* and outputs the result as a new command value idc*. The voltage vL adopted in this preferred embodiment is based on the potential of the reactor Ld on the rectifier circuit 2 side.

Now, the control block 102, and the control block 106 described later, perform PI control, and therefore the output phase delays from the input phase in the control blocks 102 and 106. Accordingly, the phase of the correction command value $\Delta idc^*$ may be shifted from the phase of the voltage vL in accordance with the phase delay.

The phase of the correction command value $\Delta idc^*$ may be delayed by 90° from the phase of the voltage vL even when no phase delay occurs in the control blocks 102 and 106. This is because, in the reactor Ld, the phase of the current iL delays by 90° from the phase of the voltage vL.

The subtracter 105 obtains a deviation $\Delta idc$ between the corrected command value idc* and the current idc.

The control block 106 performs PI control on the basis of the deviation $\Delta idc$, so as to generate a command value v* for the voltage v applied to both ends of the switch S2. According to this control, it is possible to make the current idc close to the command value idc*, making it possible to precisely control the power consumption of the second load Cdc+Load.

The triangular carrier generator 107 generates a triangular carrier synchronized to the inverter 4.

The comparator 108 compares the command value v* and the triangular carrier, so as to generate a switching command r1 for the switch S1. The switch S is controlled to on or off by the switching command r1. The switch S2 is controlled complementarily to the switch S1, and therefore a command r2 for the switch S2 is obtained by inputting the command r1 to the NOT circuit 109 and obtaining the output.

The command values r1 and r2 are obtained by the controller 10, and so no high-speed microcomputer processing is required for the control of the switching power-supply circuit 61. In general, the switching frequencies (50 to 100 kHz) of converters such as flyback converters and step-down choppers can be made larger than the switching frequency (6 kHz) of the inverter 4.

The contents described above can be regarded as: performing the switching operation of the switching power-supply circuit 61 with a duty based on the voltage vL applied to the reactor Ld, so as to supply power to the second load Cdc+Load from high-frequency components, with respect to the fundamental frequency of the input currents iu1, iv1 and iw1, of the current (−iL) flowing in the first power-supply line 21.

According to the above-described controller 10 and its control, high-frequency components that are contained in the current (−iL), with respect to the fundamental frequency of the input currents iu1, iv1, iw1, can be consumed in the second load Cdc+Load. This makes it possible to suppress the high-frequency components of the input currents iu1, iv1, iw1 to the rectifier circuit 2, and thus to suppress high-frequency disturbance to the ac power supply 1.

FIG. 4 is a graph illustrating the time variation of the input current iu1 that is exhibited when the control of this preferred embodiment is performed. FIG. 5 is a graph illustrating the time variation of the voltage vdc across both ends of the capacitor Cd that is exhibited when the control of this preferred embodiment is performed. For comparison with FIGS. 4 and 5, FIGS. 6 and 7 respectively show the waveforms of the input current iu1 and the voltage vdc that are exhibited before the control of this preferred embodiment is performed. The waveforms contain a lot of high-frequency components due to the serial resonance of the reactor Ld and the capacitor Cd. The graphs of FIGS. 4 to 7 show the results that were obtained when the command value v0* adopted 20 V, the driven part Load adopted resistance, the power consumption of the second load Cdc+Load adopted 20 W, and the power consumption of the motor 5 adopted 1.5 kW.

Comparison between FIGS. 4 and 6, and comparison between FIGS. 5 and 7, show that performing this control suppresses high-frequency components contained in the input current iu1 (accordingly the input currents iv1, iw1, too) and the voltage vdc.

Furthermore, the high-frequency components of power are smaller than the direct-current power supplied to the first load 4+5, so that the power consumption of the second load Cdc+Load that consumes them can be smaller than the power consumption in the first load 4+5. Thus, it is known that high-frequency disturbance can be suppressed even when the power consumption of the switching power-supply circuit 61 is small. Accordingly, the current flowing in the switches S1 and S2 of the switching power-supply circuit 61 can be smaller than the current flowing in the switching elements of the inverter 4. That is, the suppression provided by the control in the switching power-supply circuit 61 reduces switching loss, as compared with the switching for controlling harmonics by the control in the inverter 4. Then, the switches S1 and S2 can be of smaller current capacity, enabling size reduction of the switching power-supply circuit 61.

The controller 10 is applicable also to the control of the power converter shown in FIG. 2. However, the current i1 flowing in the coil L1 and its command value i1* are adopted in place of the current idc and its command value idc*. Also, a command value for the voltage across both ends of the coil L2 is adopted for the command value v*.

<Control 2 of the Power Converter>

Figure 8:
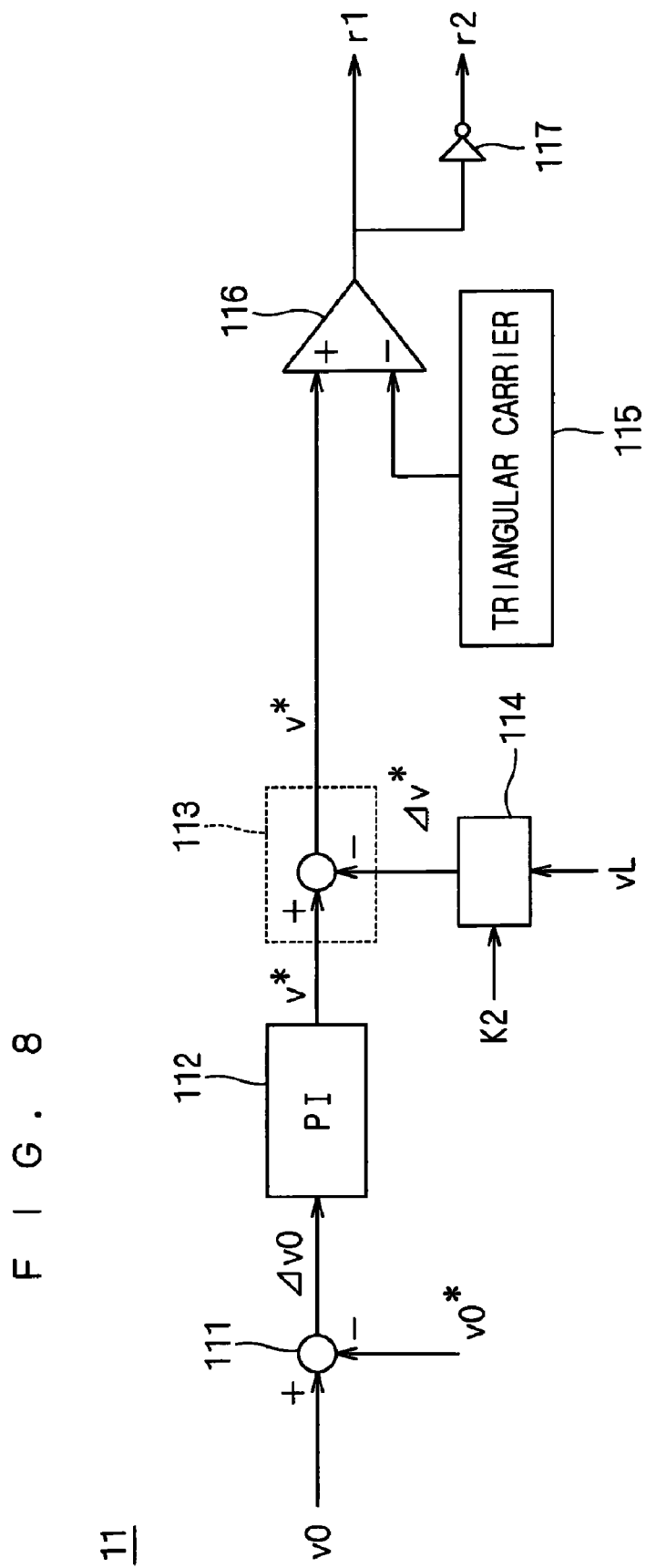
FIG. 8 is a diagram conceptually illustrating a controller 11 for the power converter.

When the control of the power consumption of the second load Cdc+Load, C2+Load, does not require very high accuracy, it is not essential to provide the subtracter 105 and the control block 106 in the controller 10. FIG. 8 shows such a configuration as a controller 11.

The controller 11 includes a subtracter 111, control blocks 112, 114, a command value corrector 113, a triangular carrier generator 115, a comparator 116, and a NOT circuit 117.

Like the subtracter 101 shown in FIG. 3, the subtracter 111 obtains a deviation Δv0.

The control block 112 performs PI control based on the deviation Δv0 to generate a command value v*.

The command value corrector 113 corrects the command value v* such that high-frequency components of the current iL flowing in the first power-supply line 21, with respect to the fundamental frequency of the input currents iu1, iv1, iw1, are consumed in the switching power-supply circuit 61. Specifically, the control block 114 multiplies the voltage vL and a gain K2 to obtain a correction value Δv*, and the command value corrector 113 subtracts the correction value Δv* from the command value v* and outputs the result as a new command value v*.

When a phase delay occurs in the control block 112, the phase of the correction command value Δv* may be shifted from the phase of the voltage vL according to the phase delay.

The triangular carrier generator 115 generates a triangular carrier synchronized to the inverter 4.

The comparator 116 compares the corrected command value v* and the triangular carrier to generate a command value r1. A command value r2 is obtained by the NOT circuit 117 complementarily to the command value r1.

Also with the controller 11 and its control, high-frequency components contained in the current (−iL), with respect to the fundamental frequency of the input currents iu1, iv1, iw1, can be consumed in the second load Cdc+Load, C2+Load. It is thus possible to suppress the high-frequency components of the input currents iu1, iv1, iw1 to the rectifier circuit 2, and to suppress high-frequency disturbance to the ac power supply 1.

The voltage v0 in this preferred embodiment can be adopted e.g. as a power-supply voltage of electrical equipment used in a motor driving system for an air conditioner, or a power-supply voltage for inverter control.

Second Preferred Embodiment

<Configuration of Power Converter>

Figure 9:
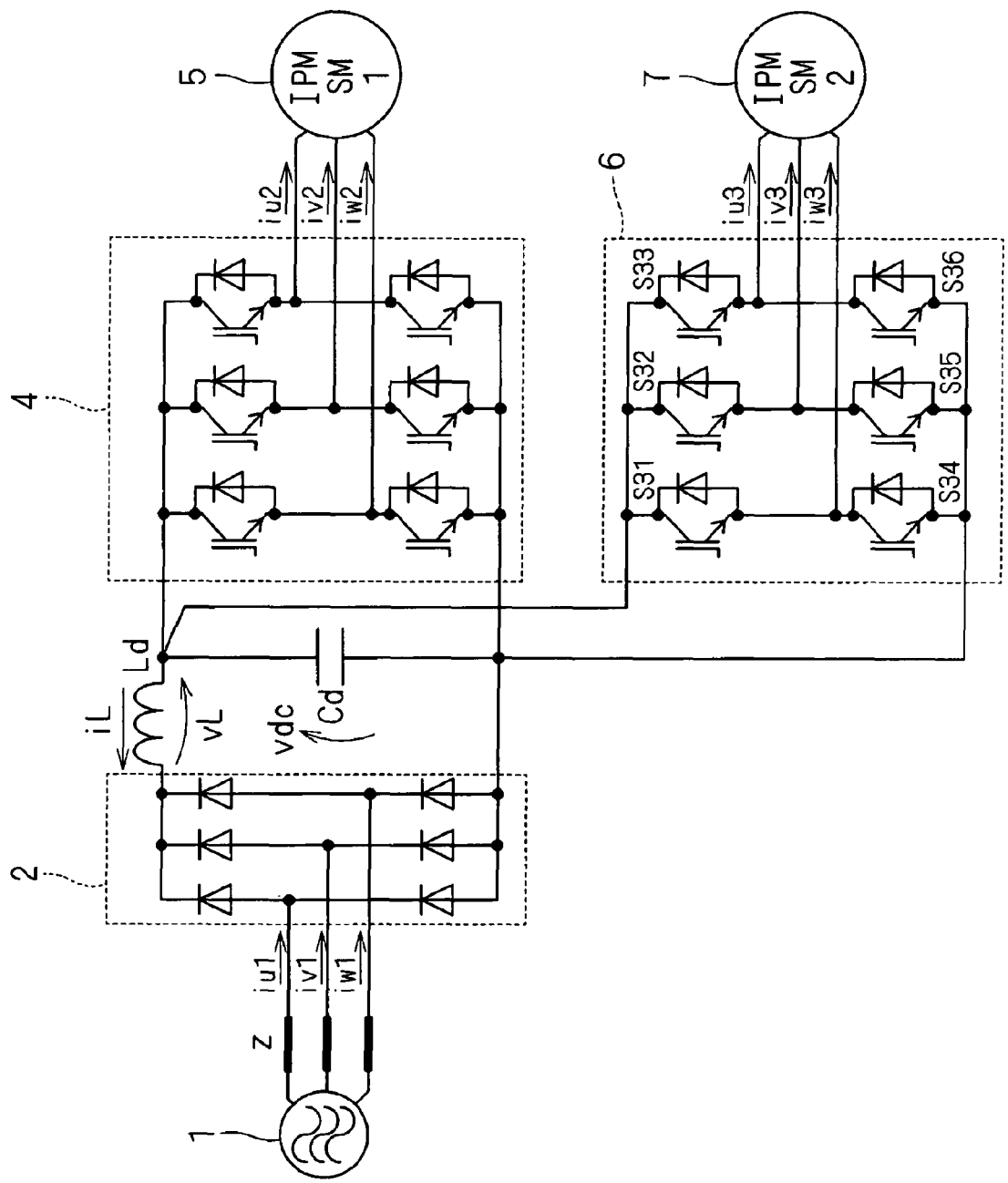
FIG. 9 is a diagram conceptually illustrating a power converter that is described in a second preferred embodiment.

FIG. 9 conceptually illustrates a power converter according to this preferred embodiment. In this power converter, a first power-supply line 21, a second power-supply line 22, a rectifier circuit 2, a capacitor Cd, a reactor Ld, and an inverter 4 are configured in the same way as those of the power converter of the first preferred embodiment, and a switching power-supply circuit 6 is connected between the first power-supply line 21 and the second power-supply line 22. FIG. 9 shows an ac power supply 1 and a motor 5 as in FIGS. 1 and 2, and it further shows a motor 7 that is supplied with the output of the switching power-supply circuit 6. With the load formed of the inverter 4 and the motor 5 being regarded as a first load 4+5, the motor 7 can be regarded as a second load.

The switching power-supply circuit 6 is a three-phase inverter and has switches S31 to S36. In this preferred embodiment, IGBT modules are adopted as the switches S31 to S36. In general, a three-phase inverter is controlled by microcomputer processing.

<Control of the Power Converter>

Figure 10:
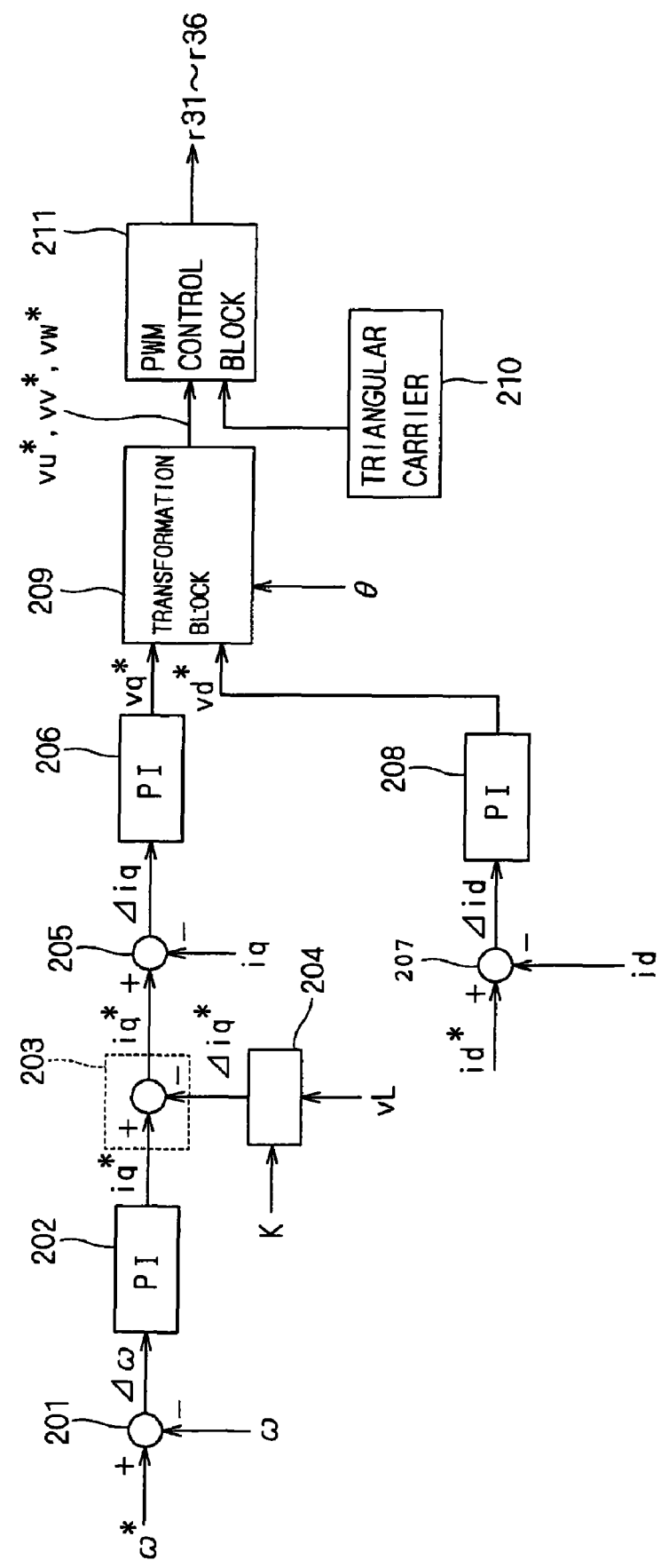
FIG. 10 is a diagram conceptually illustrating a controller 20 for the power converter.

FIG. 10 conceptually illustrates a controller 20 for controlling the power converter shown in FIG. 9.

The controller 20 includes subtracters 201, 205, 207, a command value corrector 203, control blocks 202, 204, 206, 208, a transformation block 209, a triangular carrier generator 210, and a PWM (Pulse Width Modulation) control block 211. The subtracter 201 obtains a deviation Δω of the rotating speed ω of the motor 7 with respect to its command value ω*.

The control block 202 performs PI control on the basis of the deviation Δω, so as to generate a command value iq* for the q-axis current iq flowing in the motor. According to this control, it is possible to make the rotating speed ω close to the command value ω*, and thus to rotate the motor 7 stably.

The command value corrector 203 corrects the command value iq* such that high-frequency components with respect to the fundamental frequency of the input currents iu1, iv1, iw1 are consumed in the switching power-supply circuit 6.

In this preferred embodiment, the command value corrector 203 corrects the command value iq* on the basis of the voltage vL applied to the reactor Ld. Specifically, the control block 204 multiplies the voltage vL and a gain K to obtain a correction value Δiq*, and the command value corrector 203 subtracts the correction value Δiq* from the command value iq* and outputs the result as a new command value iq*.

Now, as described in the first preferred embodiment, the phase of the correction command value Δiq* may be shifted from the phase of the voltage vL according to phase delays in the control block 202 and the control block 206 that perform PI control. The phase of the correction command value Δiq* may be delayed by 90° from the phase of the voltage vL even when no phase delay occurs in the control blocks 202 and 206.

The subtracter 205 obtains a deviation Δiq between the corrected command value iq* and the q-axis current iq.

The control block 206 performs PI control on the basis of the deviation Δiq to generate a command value vq* for the q-axis voltage vq applied to the motor 7. According to this control, it is possible to make the q-axis current iq close to the command value iq*.

The subtracter 207 obtains a deviation Δid of the d-axis current id flowing in the motor 7 with respect to its command value id*.

The control block 208 performs PI control on the basis of the deviation Δid, so as to generate a command value vd* for the d-axis voltage vd applied to the motor 7. According to this control, it is possible to make the d-axis current id close to the command value id*. As mentioned above, the current iq is also made close to its command value iq*, and the power consumption of the motor 7 can thus be precisely controlled.

The transformation block 209 transforms the coordinates from the d-q axis coordinate system to three-phase coordinate system. Accordingly, the command values vq* and vd* inputted to the transformation block 209 are converted to command values vu*, w*, vw* for the three-phase voltages vu, vv, vw, and outputted from the transformation block 209.

The triangular carrier generator 210 generates a triangular carrier synchronized to the inverter 4.

The PWM control block 211 generates commands r31 to r36 respectively for the switches S31 to S36, on the basis of the command values vu*, vv*, vw* and the triangular carrier. The switch S31 and the switch S34, the switch S32 and the switch S35, and the switch S33 and the switch S36, are controlled complementarily.

The contents described above can be regarded as: performing the switching operation of the switching power-supply circuit 6 with a duty based on the voltage vL applied to the reactor Ld, so as to supply power to the motor 7 from high-frequency components, with respect to the fundamental frequency of the input currents iu1, iv1, iw1, of the current (−iL) flowing in the first power-supply line 21.

According to the above-described controller 20 and its control, high-frequency components that are contained in the current (−iL), with respect to the fundamental frequency of the input currents iu1, iv1, iw1, can be consumed in the motor 7. This makes it possible to suppress the high-frequency components of the input currents iu1, iv1, iw1 to the rectifier circuit 2, and to suppress high-frequency disturbance to the ac power supply 1.

Figure 11:
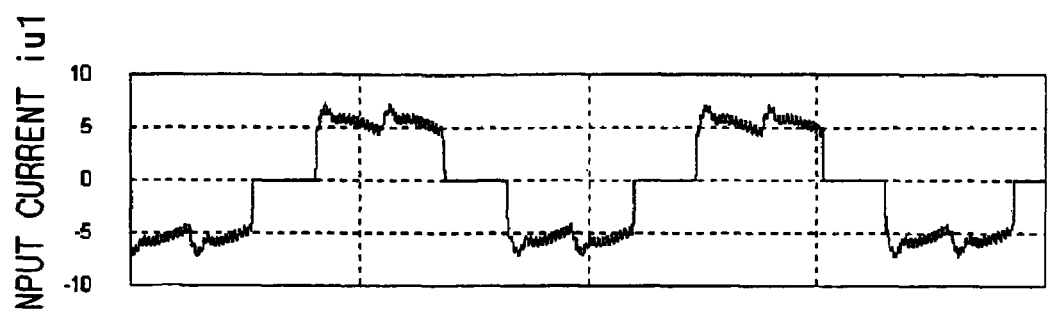
FIG. 11 is a graph illustrating the input current iu1 that is exhibited when the control described in the second preferred embodiment is performed.
Figure 12:
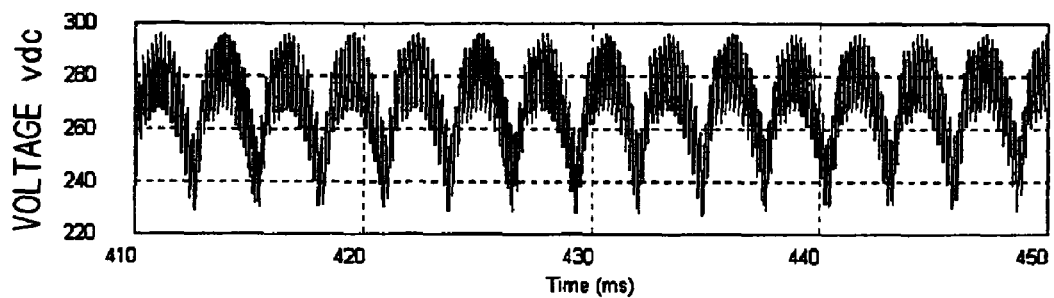
FIG. 12 is a graph illustrating the voltage vdc that is exhibited when the control described in the second preferred embodiment is performed.

FIG. 11 is a graph illustrating the time variation of the input current iu1 that is exhibited when the control of this preferred embodiment is performed. FIG. 12 is a graph showing the time variation of the voltage vdc across both ends of the capacitor Cd that is exhibited when the control of this preferred embodiment is performed. For comparison with FIGS. 11 and 12, FIGS. 13 and 14 respectively show the waveforms of the input current iu1 and the voltage vdc that are exhibited before the control of this preferred embodiment is performed. The waveforms contain a lot of high-frequency components due to the serial resonance of the reactor Ld and the capacitor Cd. The graphs of FIGS. 11 to 14 show the results that were obtained when the power consumption of the motor 5 adopted 1.5 kW, the command value ω* for the motor 7 adopted 500 rpm, and the output power of the motor 7 adopted 20 W.

Figure 13:
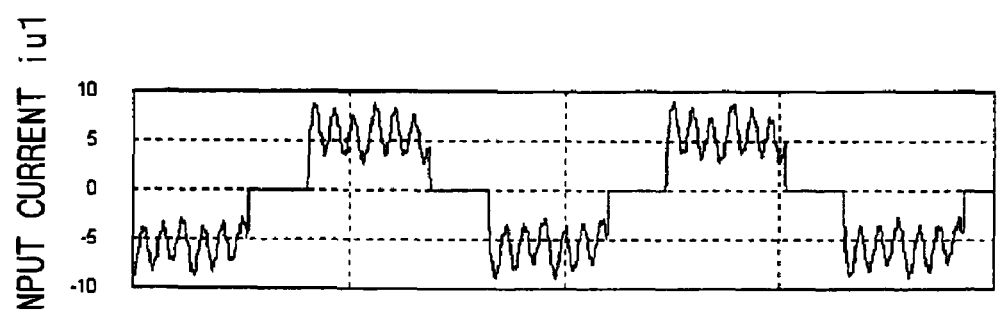
FIG. 13 is a graph illustrating the input current iu1 that is exhibited before the control described in the second preferred embodiment is performed.
Figure 14:
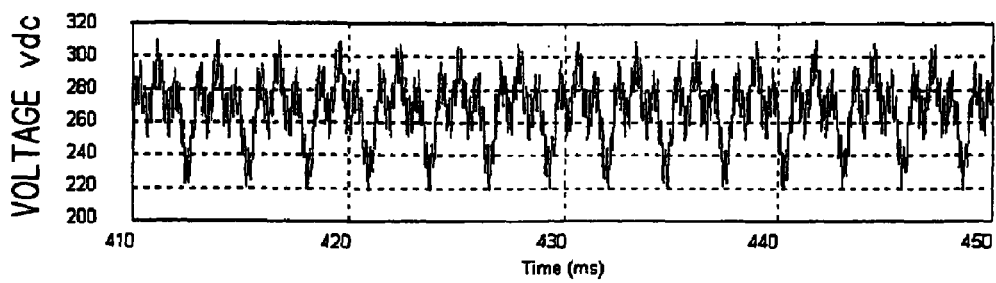
FIG. 14 is a graph illustrating the voltage vdc that is exhibited before the control described in the second preferred embodiment is performed.

Comparison between FIGS. 11 and 13, and comparison between FIGS. 12 and 14, show that performing this control suppresses the high-frequency components contained in the input current iu1 (accordingly the input currents iv1, iw1, too) and the voltage vdc.

Furthermore, considering that the power consumption of the motor 7 is set at 20 W, and also that the power consumption in the motor 5 is about 1.5 kW, it is known that the high-frequency disturbance can be suppressed even when the power consumption in the switching power-supply circuit 6 is small. Thus, the switching loss in the switching power-supply circuit 6 can be reduced. Then, the switches S31 to S36 can be of smaller current capacity. This makes it possible to downsize the switching power-supply circuit 6.

The switching frequency of the inverter adopted to the switching power-supply circuit 6 is generally about the same as the switching frequency of the inverter 4 (6 kHz). However, when the above-described control is performed with the switching power-supply circuit 6, the switches S31 to S36 are switched at a switching frequency of around 50 kHz. Accordingly, from the viewpoint of microcomputer processing, the controlling with the power converter described in the first preferred embodiment is desirable.

Third Preferred Embodiment

FIG. 15 illustrates a configuration in which a single-phase alternating-current power supply is adopted as the ac power supply 1 in the power converter shown in FIG. 1. In this case, the rectifier circuit 2 rectifies an input current ic from the ac power supply 1 and outputs direct-current voltage between the first power-supply line 21 and the second power-supply line 22. In other respects, it is configured in the same way as the power converter shown in FIG. 1.

Also with this power converter, performing control in the same way as described in the first preferred embodiment offers the same effects.

FIG. 16 is a graph illustrating the time variation of the input current ic that is exhibited when the control of this preferred embodiment is performed. FIG. 17 is a graph illustrating the time variation of the voltage vdc that is exhibited when the control of this preferred embodiment is performed. For comparison with FIGS. 16 and 17, FIGS. 18 and 19 respectively show the waveforms of the input current ic and the voltage vdc that are exhibited before the control of this preferred embodiment is performed. The waveforms contain a lot of high-frequency components due to the serial resonance of the reactor Ld and the capacitor Cd.

Figure 18:
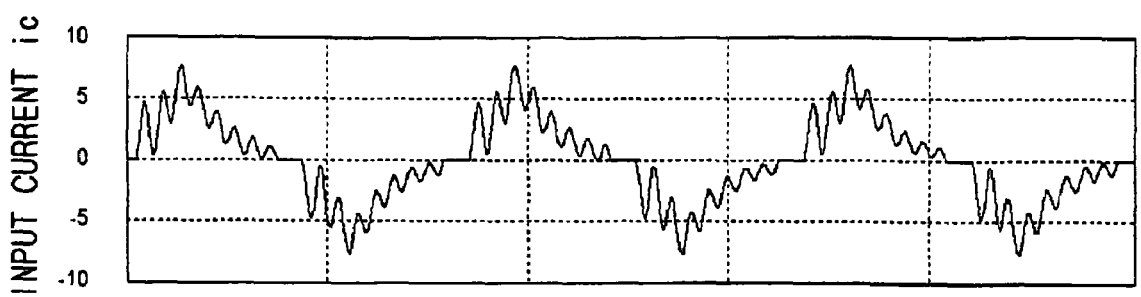
FIG. 18 is a graph illustrating the input current ic that is exhibited before the control described in the third preferred embodiment is performed.
Figure 19:
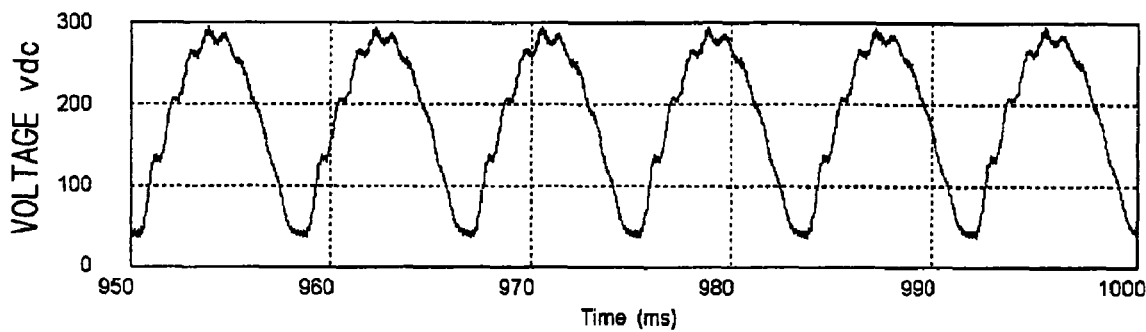
FIG. 19 is a graph illustrating the voltage vdc that is exhibited before the control described in the third preferred embodiment is performed.

Comparison between FIGS. 16 and 18, and comparison between FIGS. 17 and 19, show that performing this control suppresses the high-frequency components contained in the input current ic and the voltage vdc.

Figure 20:
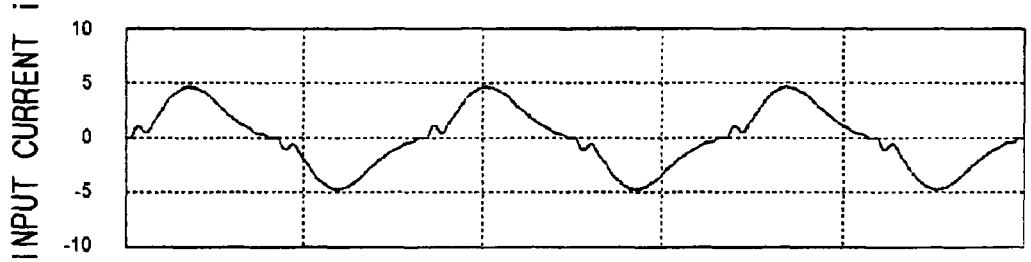
FIG. 20 is a graph illustrating the input current ic that is exhibited when the suppression of harmonics is performed with inverter 4.
Figure 21:
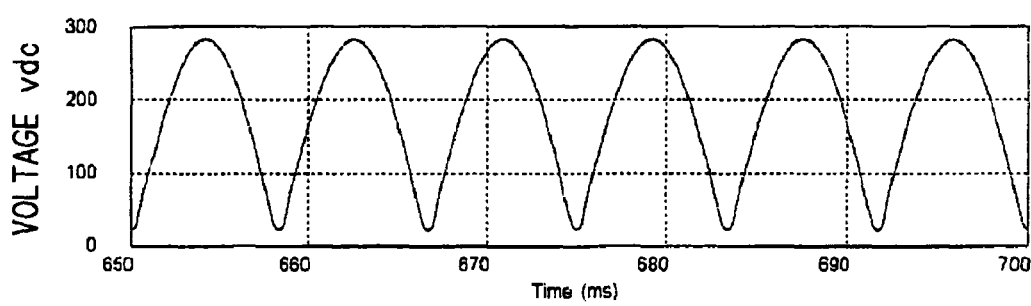
FIG. 21 is a graph illustrating the voltage vdc that is exhibited when the suppression of harmonics is performed with inverter 4.

Also, FIGS. 20 and 21 respectively show the waveforms of the input current ic and the voltage vdc that are exhibited when high-frequency waves are reduced with the inverter 4, without performing the control of this preferred embodiment.

Comparison between FIGS. 16 and 20, and comparison between FIGS. 17 and 21, show that the inverter 4 can reduce high-frequency waves to about the same extent as the control of this preferred embodiment. However, the switching frequency in the inverter 4 is high and thereby the switching loss is increased. FIGS. 20 and 21 show the results obtained when the inverter was controlled at a switching frequency of 50 kHz as the switching frequency of the inverter 4.

The same applies also when the power converters shown in FIGS. 2 and 9 adopt a single-phase ac power supply as the ac power supply 1.

In any of the first to third preferred embodiments, the correction value $\Delta idc^*$, $\Delta iq^*$, inputted to the command value corrector 103, 203 may be calculated on the basis of the current $(-iL)$ flowing in the first power-supply line.

The contents can be regarded as: causing the switching power-supply circuit 61, 62, 6 to perform switching operation with a duty based on the current $(-iL)$ flowing in the first power-supply line 21, so as to supply power to the second load Cdc+Load, C2+Load, 7, from high-frequency components of the current $(-iL)$ with respect to the fundamental frequency of the input currents iu1, iv1, iw1, ic.

This control is applicable also to control of power converters with no reactor Ld, and offers the same effects as those of the first to third preferred embodiments. That is, even when no reactor Ld is provided, there is a problem that harmonics occur due to the serial resonance of the capacitor Cd and the impedance z occurring between the ac power supply 1 and the rectifier circuit 2, and providing the control as described above suppresses the harmonics also in such cases.

Also, in any of the above-described preferred embodiments, when the voltage v0 or the rotating speed c does not require high controllability, it is not essential to provide the subtracters 101, 111, 201 and the control blocks 102, 112, 202 respectively in the controllers 10, 11, 20. That is, the command value v*, vq* may be obtained on the basis of the voltage vL or the current $(-iL)$ and the current idc, iq, and the switching operation of the switching power-supply circuit 61, 62, 6 may be controlled according to the command value v*, vq*.

The power converters described above can all be provided in air conditioners, for example. Such an air conditioner includes a motor for a refrigerant compressor and a fan for air-cooling, and the refrigerant-compressor motor is supplied with the output of the inverter 4, and the air-cooling fan is supplied with the output of the switching power-supply circuit 61, 62, 6. Then, air conditioning is achieved by operating the fan to remove the latent heat of the refrigerant compressed by the refrigerant compressor.

As compared with the refrigerant-compressor motor, the air-cooling fan requires less power consumption and rotary control accuracy. Accordingly, the control using the power converter is suitable for such air conditioners.

While the invention has been described in detail, the foregoing description is in all aspects illustrative and not restrictive. It is understood that numerous other modifications and variations can be devised without departing from the scope of the invention.

The invention claimed is:

1. A power converter comprising:
   a rectifier circuit that rectifies an input current from an alternating-current power supply and outputs a direct-current voltage between a first power-supply line and a second power-supply line, so as to apply said direct-current voltage to a first load;
   a capacitor connected between said first power-supply line and said second power-supply line; and
   a switching power-supply circuit connected between said first power-supply line and said second power-supply line, said switching power-supply circuit performing a switching operation with a duty based on a first current flowing in said first power-supply line, to supply power to a second load from a high-frequency component of said first current with respect to a fundamental frequency of said input current, wherein
   said switching power-supply circuit is connected to said second load on an output side thereof, and
   said switching power-supply circuit is connected to a third power-supply line and a fourth power-supply line each of which branching from said first power-supply line and said second power-supply line on the input side thereof.

2. The power converter according to claim 1, wherein said switching power-supply circuit comprises a switch that performs said switching operation according to a command value that is obtained on the basis of: a deviation of an output voltage applied to said second load from said switching power-supply circuit with respect to its command value; and said first current.

3. The power converter according to claim 2, wherein said switch performs said switching operation according to a second command value that is obtained on the basis of: said command value and a second current flowing in said second load.

4. The power converter according to claim 2,
   wherein said first load comprises a main load and an inverter that receives a voltage across both ends of said capacitor and outputs an alternating current to said main load, and
   said duty is determined by a comparison between said command value and a carrier for said inverter.

5. The power converter according to claim 1,
   wherein said second load is a motor, and
   said switching power-supply circuit comprises a switch that performs said switching operation according to a command value that is obtained on the basis of: a deviation of a rotating speed of said motor with respect to its command value; and said first current.

6. The power converter according to claim 1, wherein said switching power-supply circuit comprises a switch that performs said switching operation according to a command value that is obtained on the basis of: said first current and a second current flowing in said second load.

7. The power converter according to claim 1,
   wherein said first load comprises a main load and an inverter that receives a voltage across both ends of said capacitor and outputs an alternating current to said main load.

8. The power converter according to claim 1, wherein said switching power-supply circuit subtracts a correction value obtained by multiplying said first current and the predetermined value from a command value to said switching operation to correct said command value, and performs said switching operation based on corrected said command value.

9. A power converter comprising:
a rectifier circuit that rectifies an input current from an alternating-current power supply and outputs a direct-current voltage between a first power-supply line and a second power-supply line, so as to apply said direct-current voltage to a first load;
a capacitor connected between said first power-supply line and said second power-supply line;
a reactor constituting a serial resonant circuit together with said capacitor; and
a switching power-supply circuit connected between said first power-supply line and said second power-supply line, said switching power-supply circuit performing a switching operation with a duty based on a first voltage applied to said reactor, to supply power to a second load from a high-frequency component of a first current flowing in said first power-supply line with respect to a fundamental frequency of said input current, wherein
said switching power-supply circuit is connected to said second load on an output side thereof, and
said switching power-supply circuit is connected to a third power-supply line and a fourth power-supply line each of which branching from said first power-supply line and said second power-supply line on the input side thereof.

10. The power converter according to claim 9, wherein said switching power-supply circuit comprises a switch that performs said switching operation according to a command value that is obtained on the basis of: a deviation of an output voltage applied to said second load from said switching power-supply circuit with respect to its command value; and said first voltage.

11. The power converter according to claim 9,
wherein said second load is a motor, and
said switching power-supply circuit comprises a switch that performs said switching operation according to a command value that is obtained on the basis of: a deviation of a rotating speed of said motor with respect to its command value; and said first voltage.

12. The power converter according to claim 9, wherein said switching power-supply circuit comprises a switch that performs said switching operation according to a command value that is obtained on the basis of: said first voltage and a second current flowing in said second load.

13. The power converter according to claim 9, wherein said switching power-supply circuit subtracts a correction value obtained by multiplying said first voltage and the predetermined value from a command value to said switching operation to correct said command value, and performs said switching operation according to corrected said command value.

14. An air conditioner comprising:
a power converter that comprises a rectifier circuit that rectifies an input current from an alternating-current power supply and outputs a direct-current voltage between a first power-supply line and a second power-supply line, so as to apply said direct-current voltage to a first load; a capacitor connected between said first power-supply line and said second power-supply line; and a switching power-supply circuit connected between said first power-supply line and said second power-supply line, said switching power-supply circuit performing a switching operation with a duty based on a first current flowing in said first power-supply line, to supply power to a second load from a high-frequency component of said first current with respect to a fundamental frequency of said input current, said first load comprising a main load and an inverter that receives a voltage across both ends of said capacitor and outputs an alternating current to said main load;
a motor for a refrigerant compressor, said motor forming said main load; and
an air-cooling fan that forms said second load,
said air conditioner performing air conditioning by operating said fan to remove latent heat of a refrigerant compressed by said refrigerant compressor, and
said switching power-supply circuit is connected to a third power-supply line and a fourth power-supply line each of which branching from said first power-supply line and said second power-supply line on the input side thereof.

15. A power converter controlling method for controlling a power converter, said power converter comprising:
a rectifier circuit that rectifies an input current from an alternating-current power supply and outputs a direct-current voltage between a first power-supply line and a second power-supply line, so as to apply said direct-current voltage to a first load;
a capacitor connected between said first power-supply line and said second power-supply line; and
a switching power-supply circuit connected between said first power-supply line and said second power-supply line,
said power converter controlling method causing said switching power-supply circuit to perform a switching operation with a duty based on a first current flowing in said first power-supply line, to supply power to a second load from a high-frequency component of said first current with respect to a fundamental frequency of said input current, wherein
said switching power-supply circuit is connected to said second load on an output side thereof, and
said switching power-supply circuit is connected to a third power-supply line and a fourth power-supply line each of which branching from said first power-supply line and said second power-supply line on the input side thereof.

16. The power converter controlling method according to claim 15, which causes said switching power-supply circuit to perform said switching operation according to a command value that is obtained on the basis of: a deviation of an output voltage applied to said second load from said switching power-supply circuit with respect to its command value; and said first current.

17. The power converter controlling method according to claim 16, which causes said switching power-supply circuit to perform said switching operation according to a second command value that is obtained on the basis of: said command value and a second current flowing in said second load.

18. The power converter controlling method according to claim 16,
wherein said first load comprises a main load and an inverter that receives a voltage across both ends of said capacitor and outputs an alternating current to said main load, and
said duty is determined by a comparison between said command value and a carrier for said inverter.

19. The power converter controlling method according to claim 15,
wherein said second load is a motor, and
said power converter controlling method causes said switching power-supply circuit to perform said switching operation according to a command value that is obtained on the basis of: a deviation of a rotating speed of said motor with respect to its command value; and said first current.

20. The power converter controlling method according to claim 15, which causes said switching power-supply circuit to perform said switching operation according to a command value that is obtained on the basis of: said first current and a second current flowing in said second load.

21. The power converter controlling method according to claim 15, which causes said switching power-supply circuit to perform said switching operation according to a command value that is obtained by subtracting a correction value obtained by multiplying said first current and the predetermined value from a command value to said switching operation.

22. A power converter controlling method for controlling a power converter, said power converter comprising:
   a rectifier circuit that rectifies an input current from an alternating-current power supply and outputs a direct-current voltage between a first power-supply line and a second power-supply line, so as to apply said direct-current voltage to a first load;
   a capacitor connected between said first power-supply line and said second power-supply line;
   a reactor constituting a serial resonant circuit together with said capacitor; and
   a switching power-supply circuit connected between said first power-supply line and said second power-supply line,
   said power converter controlling method causing said switching power-supply circuit to perform a switching operation with a duty based on a first voltage applied to said reactor, to supply power to a second load from a high-frequency component of a first current flowing in said first power-supply line with respect to a fundamental frequency of said input current, wherein
   said switching power-supply circuit is connected to said second load on an output side thereof, and
   said switching power-supply circuit is connected to a third power-supply line and a fourth power-supply line each of which branching from said first power-supply line and said second power-supply line on the input side thereof.

23. The power converter controlling method according to claim 22, which causes said switching power-supply circuit to perform said switching operation according to a command value that is obtained on the basis of: a deviation of an output voltage applied to said second load from said switching power-supply circuit with respect to its command value; and said first voltage.

24. The power converter controlling method according to claim 22,
   wherein said second load is a motor, and
   said power converter controlling method causes said switching power-supply circuit to perform said switching operation according to a command value that is obtained on the basis of: a deviation of a rotating speed of said motor with respect to its command value; and said first voltage.

25. The power converter controlling method according to claim 22, which causes said switching power-supply circuit to perform said switching operation according to a command value that is obtained on the basis of: said first voltage and a second current flowing in said second load.

26. The power converter controlling method according to claim 22, which causes said switching power-supply circuit to perform said switching operation according to a command value that is obtained by subtracting a correction value obtained by multiplying said first voltage and the predetermined value from a command value to said switching operation.

* * * * *